United States Patent
Forster (10) Patent No.: US 7,059,518 B2
(45) Date of Patent: Jun. 13, 2006

(54) RFID DEVICE DETECTION SYSTEM AND METHOD

(75) Inventor: Ian J. Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 167 days.

(21) Appl. No.: 10/406,702

(22) Filed: Apr. 3, 2003

(65) Prior Publication Data

US 2004/0195319 A1 Oct. 7, 2004

(51) Int. Cl.
*G06F 17/60* (2006.01)
(52) U.S. Cl. .................... 235/385; 235/451
(58) Field of Classification Search ........... 340/572.7, 340/572.8, 572.1, 572.5, 573.3, 573.4; 235/451, 235/385
See application file for complete search history.

(56) References Cited

U.S. PATENT DOCUMENTS

| | | | |
|---|---|---|---|
| 5,153,983 A | 10/1992 | Oyama | |
| 5,545,291 A | 8/1996 | Smith et al. | |
| 5,564,888 A | 10/1996 | Doan | |
| 5,621,199 A | 4/1997 | Calari et al. | |
| 5,783,856 A | 7/1998 | Smith et al. | |
| 5,824,186 A | 10/1998 | Smith et al. | |
| 5,854,480 A | 12/1998 | Noto | |
| 5,874,724 A | 2/1999 | Cato | |
| 5,904,545 A | 5/1999 | Smith et al. | |
| 5,973,598 A * | 10/1999 | Beigel | 340/572.1 |
| 5,977,877 A * | 11/1999 | McCulloch et al. | 340/572.8 |
| 5,983,363 A | 11/1999 | Tuttle et al. | |
| 6,001,211 A | 12/1999 | Hiroyuki | |
| 6,043,746 A * | 3/2000 | Sorrells | 340/572.7 |
| 6,104,291 A | 8/2000 | Beauvillier et al. | |
| 6,107,920 A * | 8/2000 | Eberhardt et al. | 340/572.7 |
| 6,145,901 A | 11/2000 | Rich | |
| 6,147,605 A | 11/2000 | Vega et al. | |
| 6,172,609 B1 | 1/2001 | Lu et al. | |
| 6,204,764 B1 | 3/2001 | Maloney | |
| 6,206,292 B1 | 3/2001 | Robertz et al. | |
| 6,236,316 B1 | 5/2001 | Eberhardt et al. | |
| 6,259,408 B1 * | 7/2001 | Brady et al. | 343/700 MS |
| 6,262,292 B1 | 7/2001 | Yasuda et al. | |
| 6,265,977 B1 | 7/2001 | Vega et al. | |
| 6,274,508 B1 | 8/2001 | Jacobsen et al. | |
| 6,281,038 B1 | 8/2001 | Jacobsen et al. | |

(Continued)

FOREIGN PATENT DOCUMENTS

EP 0896706 6/2000

(Continued)

Primary Examiner—Thien M. Le
Assistant Examiner—Kimberly D. Nguyen
(74) Attorney, Agent, or Firm—Renner, Otto, Boisselle & Sklar, LLP (57) ABSTRACT

An RFID device detection system includes a proximity locator, which generates an electric field for reading an antennaless RFID device, or for reading other, antennaed RFID devices. An antennaless RFID device includes non-antenna conductive leads coupled to a chip. The proximity locator includes one or more conductors forming a transmission line structure arranged to set up a strong RF electric field in proximity to the locator. The strong RF electric field may be a short-range field that provides significant RF energy only over a relatively short distance, when compared with traditional RF fields that are set up over a relatively large distance. The short-range RF field allows coupling to antennaed and antennaless RFID devices that are near to the proximity locator. The RFID device detection system may be employed in a variety of tasks, including inventory control and theft detection.

41 Claims, 7 Drawing Sheets

U.S. PATENT DOCUMENTS

| | | |
|---|---|---|
| 6,291,896 B1 | 9/2001 | Smith |
| 6,316,278 B1 | 11/2001 | Jacobsen et al. |
| 6,380,729 B1 | 4/2002 | Smith |
| 6,384,727 B1 | 5/2002 | Diprizio et al. |
| 6,392,544 B1 | 5/2002 | Collins et al. |
| 6,407,665 B1 | 6/2002 | Maloney |
| 6,417,025 B1 | 7/2002 | Gengel |
| 6,451,154 B1 | 9/2002 | Grabau et al. |
| 6,600,420 B1 | 7/2003 | Goff et al. |
| 6,683,254 B1 | 1/2004 | Gunnels |
| 6,690,264 B1 * | 2/2004 | Dalglish .................... 340/10.4 |
| 6,720,866 B1 * | 4/2004 | Sorrells et al. ............ 340/10.4 |
| 6,774,782 B1 * | 8/2004 | Runyon et al. ............ 340/505 |
| 6,825,754 B1 * | 11/2004 | Rolin ....................... 340/10.34 |
| 2001/0006368 A1 | 7/2001 | Maloney |
| 2001/0054755 A1 | 12/2001 | Kirkham |
| 2002/0035701 A1 | 3/2002 | Casebolt et al. |
| 2002/0145520 A1 | 10/2002 | Maloney |
| 2004/0032330 A1 | 2/2004 | Hoffman |
| 2004/0046020 A1 | 3/2004 | Andreasson et al. |
| 2004/0046643 A1 | 3/2004 | Becker et al. |
| 2004/0059629 A1 | 3/2004 | Luo et al. |
| 2004/0066280 A1 | 4/2004 | Pratt et al. |
| 2004/0160233 A1 * | 8/2004 | Forster |

FOREIGN PATENT DOCUMENTS

| | | |
|---|---|---|
| WO | 82/00541 | 2/1982 |
| WO | 93/05489 | 3/1993 |
| WO | 00/16277 | 3/2000 |
| WO | 00/16280 | 3/2000 |
| WO | 00/41148 | 7/2000 |
| WO | 01/73864 | 4/2001 |
| WO | 01/50547 | 7/2001 |
| WO | 01/71686 | 9/2001 |
| WO | 01/80174 | 10/2001 |

* cited by examiner

RFID DEVICE DETECTION SYSTEM AND METHOD

BACKGROUND OF THE INVENTION

1. Field of the Invention

This invention relates to the field of radio frequency identification (RFID) tag and label detection systems, and to methods of detecting RFID tags and labels.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

In activating, reading, and/or detecting RFID devices, radio frequency (RF) fields are generally sent over a relatively long range, that is, over intervening free space. Thus detection of devices is accomplished over a significantly-sized region, and special discrimination in reading and detection of devices may be difficult.

Moreover, while RFID devices are inexpensive, and costs of RFID devices have been going down, the size and cost of such devices may make them impractical for use with small or inexpensive items.

From the foregoing it will be seen that there is room for improvement for RFID devices and RFID device detection systems.

SUMMARY OF THE INVENTION

According to an aspect of the invention, an RFID device detection system detects RFID devices by uses of short-range RF electric fields to power RFID devices. The RFID devices may include antennaless RFID devices.

According to another aspect of the invention, an RFID device detection system uses capacitive couple to power RFID devices. The RFID devices may include antennaless RFID devices.

According to yet another aspect of the invention, an RFID device detection system includes a transmission line structure for short-range coupling to RFID devices.

According to still another aspect of the invention, an RFID device detection system provides an AC signal along a pair of substantially parallel transmission lines, to produce an electric field for powering an RFID device.

According to a further aspect of the invention, an RFID device detection system includes a transmission line structure that is at least part of a protrusion, wherein the transmission line structure includes at least two transmission lines.

According to a still further aspect of the invention, a radio frequency identification (RFID) device detection system includes a reader; and a proximity locator operatively coupled to the reader. The proximity locator includes a transmission line structure that includes at least two transmission lines. The transmission lines are configured to produce a radio frequency (RF) electric field between the transmission lines.

According to another aspect of the invention, a method of detecting RFID devices includes the steps of: producing an RF electric field about a transmission line structure by sending an AC signal along at least two transmission lines of the transmission line structure; powering the RFID devices using the RF electric field; and detecting the RFID devices using a reader coupled to the transmission line structure.

According to yet another aspect of the invention, a method of object tracking includes the steps of: placing an RFID device on each of the objects; and electrically detecting when the objects are moved away from a proximity locator that is part of an RFID device detection system.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

An RFID device detection system includes a proximity locator, which generates an electric field for reading an antennaless RFID device, or for reading other, antennaed RFID devices. An antennaless RFID device includes non-antenna conductive leads coupled to a chip. The proximity locator includes one or more conductors forming a transmission line structure arranged to set up a strong RF electric field in proximity to the locator. The strong RF electric field may be a short-range field that provides significant RF energy only over a relatively short distance, when compared with traditional RF fields that are set up over a relatively large distance. The short-range RF field allows coupling to antennaed and antennaless RFID devices that are near to the proximity locator. The RFID device detection system may be employed in a variety of tasks, including inventory control and theft detection.

As used herein, the term "antennaless" refers broadly to devices lacking an antenna that is viable for receiving RF energy for remote, long-range reading. In characterizing antennaless devices, it is useful to compare them with well-known antennaed structures. An example of a well-known antenna structure is a dipole antenna with a good impedance match between the antenna and an RFID chip. A good impedance match provides good power transfer between antenna and chip. A dipole antenna has an antenna gain, relative to a perfect antenna, of approximately 2 dBi (decibels relative to an isotropic radiator—something that radiates equally in all directions). In a perfectly-impedance-matched situation, all of the power received by the antenna will be transmitted to the RFID chip.

Relative to structures described above having a perfect antenna or an impedance-matched dipole antenna, an "antennaless" structure will perform poorly. Such poor performance may in part be due to an inherently low antenna gain (due to small physical dimensions of the structure relative to wavelengths of RF energy). Another factor in poor performance of antennaless structures may be a poor impedance match between the chip and connected conductors (such as conductive leads), which manifests itself as a further power loss. Thus in an antennaless RFID device there may be losses, relative to a traditional antennaed RFID device, due to small size of conductive structures that could receive RF energy, and/or due to poor impedance match, limiting efficiency of power transfer between the conductive structures and a chip of the device.

An antennaless RFID device, as the term is used herein, is defined as a device having a structure such that when it is placed in the far field of a transmitter (defined below), an RFID chip of the device that is attached to the structure will absorb −20 dB in power compared to an impedance-matched dipole antenna. Put in other words, the structure of an antennaless, when placed in the far field of an RF transmitter, provides to an attached RFID chip 1% or less of the power that an impedance-matched dipole antenna would provide to the RFID chip.

An antennaless RFID device may be powered through use of a proximity locator, a device that generates a short-range RF field, with relatively low far-field RF radiation. The far field, as used herein, refers to a distance greater than about 15 mm from an RF-energy emitting device, such as device that emits UHF RF energy. Coupling of an RFID device in the far field is also referred to as "long-range coupling." The near field, where short-range coupling may occur, is defined as less than approximately 15 mm from an RF-energy emitting device. Placement of the RFID device in the near field is also referred to herein as placement of the device in "close proximity" to the proximity locator or parts of the proximity locator.

An example of UHF RF energy, referred to above, is RF energy in the range of 860 MHz to 950 MHz. However, it will be understood that a wide variety of other RF frequencies may be utilized, including frequencies other than UHF RF frequencies. For instance, frequencies of about 2–3 GHz may be utilized, although it will be appreciated that the short-range-coupling outer range limit from the RF-energy emitting device may be reduced when higher frequencies are employed.

Figure 1:
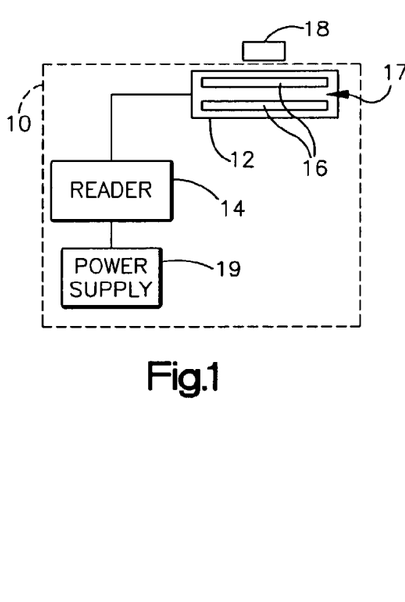
FIG. 1 is a schematic diagram of an RFID device detection system in accordance with the present invention.

Referring to FIG. 1, a simplified diagram of an RFID device detection system 10 is shown. The device detection system 10 includes a proximity locator 12 coupled to a reader 14. The proximity locator 12 includes two or more conductors 16 (transmission lines) arranged in a transmission line structure 17, so that the locator can set up a radio frequency field to detect the presence of an RFID device 18, such as via capacitance or magnetic coupling. As described in greater detail below, the RFID device 18 may be either a traditional antennaed RFID device, or alternatively may be an antennaless RFID device. The proximity locator 12 and the conductors 16 may have any of a variety of suitable configurations, some of which are described in greater detail below. The reader 14 interprets signals from the proximity locator 12 to detect the presence of the RFID device 18. A suitable power supply 19 may be used to power the reader 14.

Figure 2:
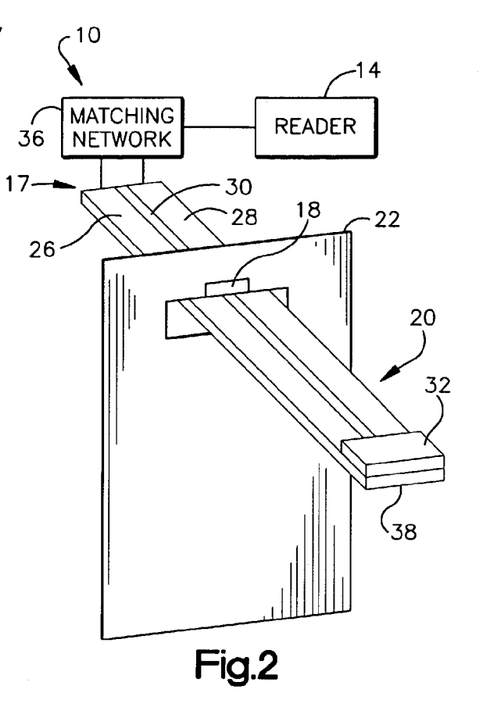
FIG. 2 is an oblique view of a specific embodiment of the RFID device detection system of FIG. 1.

Turning now to FIG. 2, one example of the RFID device detection system 10 is shown, wherein the proximity locator 12 is a protrusion 20 for hanging or placing objects 22 which have RFID devices 18 coupled thereto or therein. The conductors 16 of the proximity locator 12 shown in FIG. 2 are a pair of transmission lines 26 and 28 with a gap 30 therebetween. The transmission lines 26 and 28 form the transmission line structure 17 of the RFID detection system 10. The transmission lines 26 and 28 may be, for example, part of or upon separate metal rods or bars configured to pass through corresponding holes, slots or other openings in the objects 22, allowing the objects 22 to hang from the protrusion 20, for example as part of a display rack. The transmission lines 26 and 28 may be any of a variety of suitable conductors, such as wires, foils, or bars.

The reader 14 sends out an RF signal along the transmission lines 26 and 28, which sets up a strong RF electric field in the vicinity of the transmission lines 26 and 28. The RF signals sent out along the transmission lines 26 and 28 may be out of phase, for example being 180 degrees out of phase. Thus AC power is sent by the reader 14 along the transmission lines 26 and 28.

The RF signals sent out along the transmission lines 26 and 28 stay substantially within the transmission line structure 17, for example in the transmission lines 26 and 28, and the region roughly between the transmission lines 26 and 28. That is, there is substantially no long-range RF field created by the transmission line structure 17. The RF fields created outside the transmission line structure 17 may be due to a deviation from the desired phase relationship of the signals along the transmission lines 26 and 28.

The RFID device 18 is able to utilize power from the AC signal along the transmission lines 26 and 28 as an RF energy source. By placing the RFID device 18 in close proximity to the transmission lines 26 and 28, the RFID device 18 becomes capacitively coupled with the AC energy transmitted along the transmission lines 26 and 28. The RFID device 18 includes circuitry, such as diodes and transistors, to rectify the RFID energy of the electric field to provide a DC power supply for the RFID device 18. This power may be used to send a signal from the RFID device 18, or otherwise allow the RFID device 18 to be detected, by using circuitry in the device to modulate impedance of the RFID device 18. This in turn alters the RF energy of the electric field in a way that may be detected by the reader 14. The alteration may include creation of a "reflection" signal that changes phase and/or amplitude of the reflected energy traveling from the transmission lines 26 and 28 to the reader 14. Thus the reader 14 detects the presence or absence of the RFID device 18 in close proximity to the transmission lines 26 and 28

As mentioned above, the RF signals sent along the transmission lines 26 and 28 may be out of phase, for example being out of phase by 180 degrees. A balance transformer may be utilized to produce the out of phase RF signals. It will be appreciated that the use of out of phase RF signals is not a general requirement for the RFID device detection system, and that alternatively the system 10, specifically the transmission lines 26 and 28, may be configured so as to utilize RF signals that are not out of phase.

The transmission lines 26 and 28 are coupled together at a distal end of the protrusion 20 by a terminating resistor 32. The terminating resistor 32 functions as a load, restricting the power reflected back to the reader, which can cause a malfunction or in certain cases damage to the reader circuitry. The value of the resistor may be chosen in combination with the characteristic impedance of the transmission line so that the structure, when measured via the matching network, provides a good impedance match. A good impedance match may be defined as having a voltage standing wave ratio of 2:1 or better.

The terms "transmission line" and "transmission line structure" are intended to refer broadly to a structure configured to pass an AC signal from one point to another with a specific impedance and small loss. A transmission line thus may include a variety of separate structures, such as multiple conductors, dielectrics, etc. However, as shown in many of the embodiments illustrated herein, the transmission lines may be individual conductors, such as rods, slabs, plates, or other shapes that may be made of a unitary, continuous conductive material. It will be appreciated that a transmission line structure may include two or more such conductors, utilized as the transmission lines discussed herein for coupling to an RFID device. A transmission line structure that includes conductors may also include other components.

The RFID device detection system 10 may have a matching network 36 between the reader 14 and the transmission lines 26 and 28, to facilitate impedance matching in the system 10. The matching network 36 may be utilized to change the impedance of the signal transmitted from the reader 14 to the transmission lines 26 and 28. For example, the characteristic impedance of the reader 14 may be on the order of 50 ohms, while the desired impedance of the field set up by the transmission lines 26 and 28 may be 200 ohms. The matching network 36 may be used to shift the impedance of the signal from the reader 14 to the desired impedance for the transmission lines 26 and 28. It will be appreciated that the matching network 36 may be omitted if unnecessary.

As shown, the transmission lines 26 and 28 may be substantially parallel to one another. However, it will be appreciated that many other suitable configurations and/or orientations for the transmission lines 26 and 28 may be used for producing a strong RF field in the vicinity of the transmission lines 26 and 28.

The above discussion describes the RFID device 18 generally as a passive RFID device that is activated merely by receiving power (in the form of the RF electric field created by the transmission lines 26 and 28). It will be appreciated that alternatively the RFID device 18 may be an active device that modulates its impedance only in response to a specific type of signal or signals, for example signals corresponding to certain protocols.

Whether the RFID device 18 is an active device or a passive device, and whether it is a label or a tag, the circuitry of the device 18 may operate in a similar manner, whether the energy is provided by a typical RF field extending across free space to the RFID device 18, via a long-range RF field (if the RFID device 18 has a means to suitably receive enough energy from a long-range RF field), or by a capacitive coupling such as via the transmission lines 26 and 28. Thus the RFID device 18 may have circuitry identical to that of a corresponding RFID device, and in fact may be readable via a long-range RF field. The configuration of the circuitry of the RFID device 18 may be independent of the mode in which RF power is provided to the RFID device 18.

Further, as noted above, the RFID device 18 may be either an antennaed RFID device or an antennaless RFID device. As discussed further below, the antennaless RFID device 18 may be a portion of an antennaed RFID device, such as by being a strap that is configured to be coupled to an antenna to form an antennaed RFID device.

The gap 30 may be an air gap, with the transmission lines 26 and 28 on either side of the air gap. As noted above, the transmission lines 26 and 28 may be parts of rods or bars. Alternatively, the gap 30 may be wholly or partially filled by a dielectric material. For example, the transmission lines 26 and 28 may be metal conductors on a plastic or other dielectric substrate 38. The gap may have a width of between 0.1 to about 50 mm.

It will be appreciated that many other configurations for the transmission lines 26 and 28 are possible. For example, the transmission lines 26 and 28 may be included in parts of rods or other objects that also include other materials, such as plastics. The transmission lines 26 and 28 may be on the surface of the rods or other objects, or alternatively may be in the interior of the rods or other objects.

Figure 3:
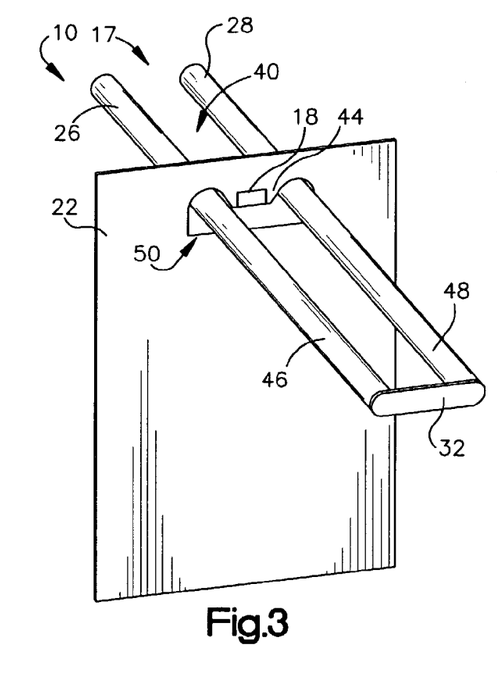
FIG. 3 is an oblique view of another specific embodiment of the RFID device detection system of FIG. 1.

As shown in FIG. 3, according to one embodiment, the RFID device 18 is located in at least partially an air gap 40 between the transmission lines 26 and 28. The object 22 may be configured to have a tab 44 that protrudes at least partially into the air gap 40 when the object 22 is hanging from rods 46 and 48, which include the respective transmission lines 26 and 28. The RFID device 18 may be placed in whole or in part on the tab 44. Put another way, the object 22 may have a rod-receiving opening 50 shaped such that the RFID device 18 is located in the air gap 40 when the object 22 is hung on the rods 46 and 48.

The rods 46 and 48 may have a circular cross section. Alternatively, the rods 46 and 48 may have other cross sectional shapes.

Figure 4:
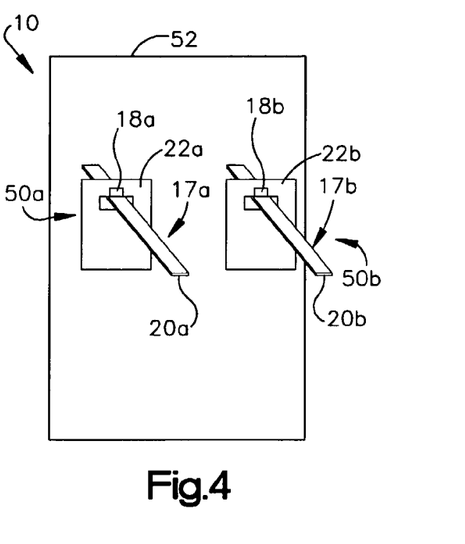
FIG. 4 illustrates an embodiment of the RFID device detection system of FIG. 1 that has multiple transmission line structures for detecting multiple RFID devices in multiple areas.

Further, it will be appreciated that there may be a greater number of transmission lines than shown in the embodiments illustrated in FIGS. 2 and 3. For example, there may be multiple transmission lines to produce a strong RF electric field in a single area. Additionally, as shown in FIG. 4, multiple transmission line structures 17a and 17b may be set up to produce strong RF electric fields in multiple locations 50a and 50b for detecting RFID devices 18a and 18b in the multiple locations 50a and 50b. A single reader 14 may be used to detect RFID devices at the multiple locations 50a and 50b. Alternatively, multiple readers may used to detect RFID devices at the multiple locations.

The RFID device detection system 10 illustrated in FIG. 4 may be used to determine the location of different classes of the objects 22a and 22b that are to be located at the different multiple locations 50a and 50b. For example, the RFID detection system 10 may include or be part of a rack 52 with different protrusions 20a and 20b. The objects 22a and 22b may have respective different types of RFID devices 18a and 18b attached thereto, the different types of RFID devices 18a and 18b having for example different readable characteristics when placed in proximity to the transmission line structures 17a and 17b. Using the different transmission line structures 17a and 17b, the system 10 may be able to determine the number and type of each of the objects 22a and 22b that are at each of the locations 50a and 50b (on each of the protrusions 20a and 20b). The use of short-range electric fields for the RFID device detection system 10 shown in FIG. 4 thus allows more precise determination of the location of the RFID devices 18a and 18b than may be possible with traditional RFID device detectors that utilize longer-range RF fields.

The use of short-range electric fields, as opposed to longer-range RF fields of traditional RFID device detectors, also provides the advantage of avoiding use of long-range RF fields, which may be perceived as undesirable by consumers and users.

Figure 5:
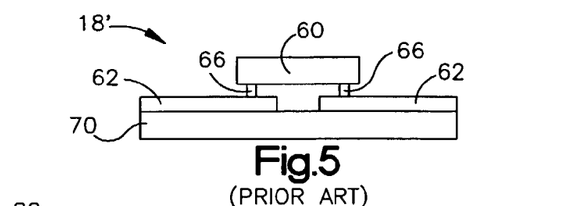
FIG. 5 is a side view showing details of a prior art antennaless RFID device such as an RFID strap.

Turning now to FIG. 5, details of one embodiment of the RFID device 18 that may be detected by the system 10, a prior art antennaless RFID device 18', are now described further. The antennaless RFID device 18' includes a chip 60, and electrically-conductive non-antenna leads 62 operatively coupled to chip contacts 66 of the chip 60. The chip 60 may be referred to herein in addition as an "electronic element." The chip 60 may include any of a variety of suitable electronic components, such as the circuitry described above for modulating the impedance of the antennaless RFID device 18.

The leads 62 may be completely made out of an electrically conducting material, such as being made out of a metal foil. Alternatively, the leads 62 may include an electrically insulating material, for example being plastic coated with metal. The antennaless device 18 may include a substrate 70 that is attached to the leads 62. The substrate 70 may be made of any of a variety of suitable materials, for example, suitable flexible polymeric materials such as PET, polypropylene or other polyolefins, polycarbonate, or polysulfone.

The antennaless RFID device 18' may be any of a variety of commercially-available straps. Examples include an RFID strap available from Alien Technologies, and the strap marketed under the name I-CONNECT, available from Philips Electronics. Alternatively, the antennaless RFID device 18' may be other than a commercially-available strap.

The leads 62 may have a length of approximately 7 mm. An antennaless RFID device with leads 7 mm long would be suitable for receiving RF energy at very high frequencies, on the order of 20 GHz, but would not be considered an antenna within the definition used herein.

More broadly, the leads may have a length of up to one-tenth of a wavelength at the operating frequency, although, as stated earlier it is desirable to minimize this for cost reasons. For example, a wavelength of 327.8 mm corresponds to an operating frequency of 915 MHz. Leads for such an operating frequency may have a length up to 33 mm.

As suggested by FIGS. 2 and 3, the RFID device 18 may be oriented such that the leads 62 of the antennaless RFID device 18' (represented more generally in FIGS. 2 and 3 as the RFID device 18) are in a plane substantially perpendicular to a plane in which the transmission lines 26 and 28 reside. In addition, the leads 62 may be in a plane that is substantially perpendicular to a direction in which the transmission lines 26 and 28 extend.

It will be appreciated that the antennaless RFID device 18' may be otherwise oriented on the object 22. For example, the antennaless RFID device 18' may be oriented such that the leads are in a plane that is substantially parallel to the plane of the transmission lines 26 and 28. Such an orientation may involve the antennaless RFID device 18' pointed downward, toward the transmission lines 26 and 28. Placing the antennaless RFID device 18' with the leads 62 other than perpendicular to the plane of the transmission lines 26 and 28 may allow for better transmission of power from the transmission line structure 17 to the antennaless RFID device 18', and/or for easier detection of the antennaless RFID device 18' by the reader 14.

Figure 6:
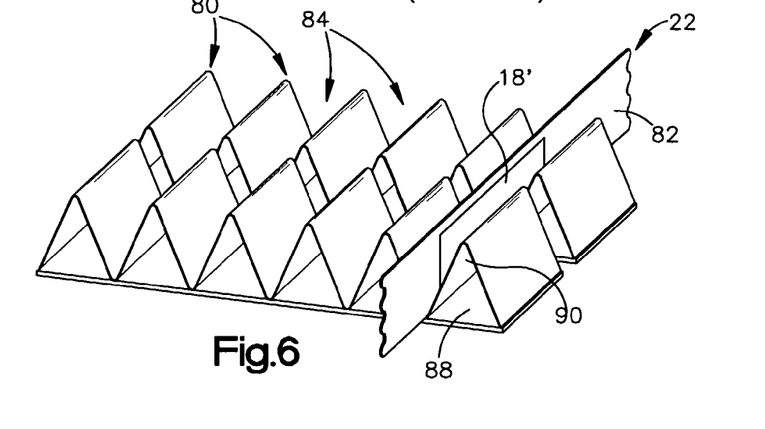
FIG. 6 shows yet another embodiment of the RFID device detection system of FIG. 1, a system that has fins on its transmission lines.

Another configuration allowing improved coupling between the antennaless RFID device 18' and the transmission lines 26 and 28 is illustrated in FIG. 6. There the transmission lines 26 and 28 are illustrated as having fins or ridges 80. A part 82 of the object 22 may settle in troughs 84 between adjacent of the ridges 80. Thus the leads 62 of the antennaless RFID device 18' may settle in the troughs 84 between the fins 80, allowing better operative coupling between the leads 62 and the transmission lines 26 and 28. Put another way, the fins 80 allow enhanced vertical parallel coupling between the leads 62 of the antennaless RFID device 18', and the transmission lines 26 and 28. Distance between conductors of the transmission lines 26 and 28, and the leads 62, is thus reduced.

The fins 80 are shown in FIG. 6 as having a tapered shape, broader at a proximal base 88 than at a distal end 90. In particular, the fins 80 shown in FIG. 6 have a substantially triangular cross-section shape. Such a shape advantageously allows the part 82 of the object 22 to enter and exit the troughs 84 relatively easily. More generally, however, it will be appreciated that the fins 80 may have any of a variety of suitable shapes that define troughs into which the part 82 of the object 22 may be placed.

The fins 80 may have a height greater than or equal to a relevant dimension of the object 22 or the antennaless RFID device 18'. For example, the fins 80 may have a height at least equal to the width of the antennaless RFID device 18'.

The fins 80 may be made of a suitable plastic film or foam material, coated with a conducting material. The fins 80 may be flexible and made of a resilient material, to aid in sliding the object 22 along the transmission lines 26 and 28.

Figure 7:
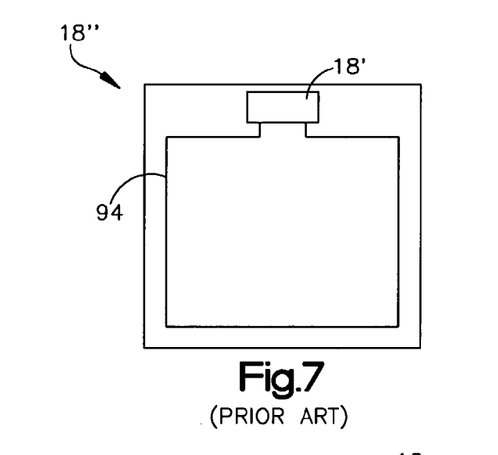
FIG. 7 is a side view showing details of a prior art antennaed RFID.

FIG. 7 shows details of another embodiment of the RFID device 18, a prior art antennaed RFID device 18", which also may be detected by the system 10. The antennaed device 18" may be a strap, such as the antennaless device 18', with an antenna 94 coupled to the leads 62. The antenna 94 shown is representative of a variety of suitable antenna configurations that may be utilized.

Figure 8:
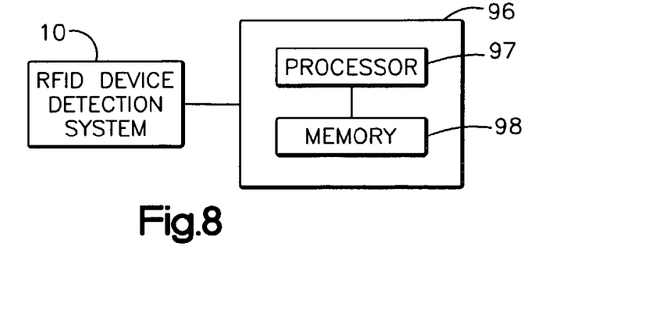
FIG. 8 is a schematic view showing another embodiment of the RFID device detection system of FIG. 1, with the RFID device detection system operatively coupled to a computer.

The various embodiments of the RFID device detection system 10 shown in the figures and described above may be utilized in a variety of ways to keep track of objects, such as products for sale at a store. As one example, the system 10 may be used as an inventory control system. The system 10 may be configured to detect when individual objects 22 are placed on or removed from a holder, such as a rack, that incorporates the proximity locator 12. It will be appreciated that such an inventory control system may be interfaced with other systems, such as systems for ordering additional inventory, or for sending alerts or other types of messages regarding inventory. As illustrated in FIG. 8, the RFID device detection system 10 may be operatively coupled to a computer system 96 having a processor 97 and a memory 98, for processing and storage of information regarding the RFID devices 18 detected by the RFID device detection system 10.

The processor 97 may be any of a wide variety of suitable computer processors. The memory 98 may be any of a wide variety of suitable computer storage devices, including random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory devices.

The RFID device detection system 10 may also be utilized in a variety of ways as a theft detection or warning system. Some merchandise objects are vulnerable to shoplifting because of their small size and resalability, among other features. An example is razor blades, which are sold in easily concealable packets. The RFID device detection system 10 may be configured to provide an alert to a store employee when an unusual removal of objects 22 (with RFID devices 18 attached) away from the proximity locator 12 is detected. One instance of an unusual removal may be the removal of a greater than usual number of the objects 22, i.e., more than the usual number of items purchased by a single consumer. The RFID device detection system 10 may be configured to look for such a removal of an uncommonly large number of objects over a predetermined time interval. Once removal of an uncommonly large number of items is detected and an alert is transmitted to a store employee, such as a clerk or a guard, the employee may take appropriate action, such as increasing surveillance of customers and/or contacting law enforcement personnel.

Another example of unusual removal of objects is the removal of objects other than the topmost or forwardmost object on a protrusion (the object most visible to and presented to a customer shopping at a display). The RFID device detection system 10 may be configured to store information regarding the order of the objects 22 that are on a protrusion or otherwise in the range of the proximity detector. This may be accomplished by storing information about the RFID devices 18 on the respective objects 22 as the objects 22 are placed on the protrusion 20. The RFID devices 18 may have individual signatures substantially unique to a single RFID device. This may be either by design, such as by RFID devices having substantially unique characteristics such as individual identifiers, or by circumstance, such as the RFID devices having detectably different characteristics, without such differences being designed into the device. Information regarding the characteristics of the individual antennaless RFID devices, and their order, may be stored in the memory 98 of the computer 96, and may be accessed by the processor 97.

Figure 9:
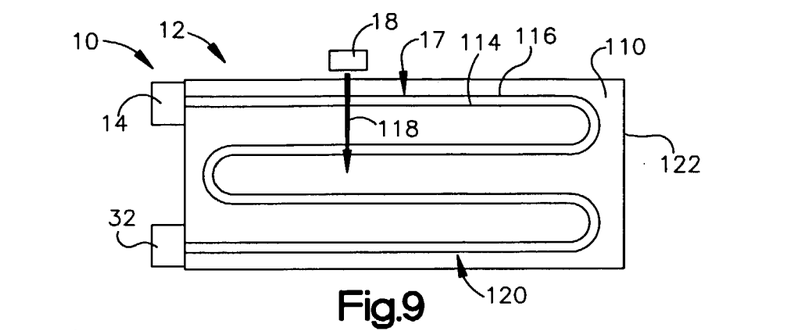
FIGS. 9 and 10 are plan views of other embodiments of the RFID device detection system of FIG. 1, with proximity detectors having surfaces that RFID devices may be swiped across.
Figure 10:
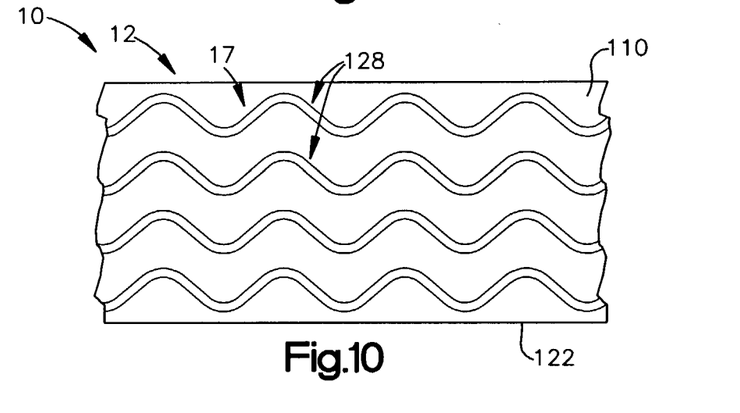

Turning now to FIGS. 9 and 10, additional embodiments of the RFID device detection system 10 are shown, in each of which the proximity locator 12 includes a transmission line structure 17 that is configured to form a surface 110 for reading RFID devices 18 that are swiped across the surface. The proximity detector 12 shown in FIG. 9 utilizes a pair of transmission lines 114 and 116, substantially parallel to one another and following a serpentine shape from a reader 14 to a terminating resistor or load 32. This allows reading by swiping the RFID device 18 in a direction 118 that is substantially parallel to the direction of the electric field set up by parallel portions 120 of the serpentine shape of the transmission lines 114 and 116 (substantially perpendicular to the direction along the transmission lines 114 and 116 at the parallel portions 120). The transmission lines 114 and 116 may be placed on or within a substrate 122.

Another transmission line configuration is shown in FIG. 10, wherein the transmission structure 17 shown there has multiple pairs of transmission lines 128 parallel to one another, each of the transmission lines 128 having a serpentine shape. The changes in orientation of the transmission lines 128 along their length allows reading of RFID devices that are swiped across the surface 110 in any direction. Similarly to the RFID device detection system shown in FIG. 9, the transmission lines 128 may be placed on or within a substrate 122.

It will be appreciated that the configurations of the transmission lines shown in FIGS. 9 and 10 are only two of a large variety of suitable configurations for transmission lines for a proximity locator to be utilized as a swipable reader. Further, it will be appreciated that surfaces of such swipable readers may be any of a variety of shapes and/or sizes.

The RFID device detection systems shown in FIGS. 9 and 10 allow reading of an antennaed or antennaless RFID device, by swiping an object with the device across the surface 110. It will be appreciated that the system of FIGS. 9 and 10 may be coupled with other systems described earlier, and/or may, where suitable, have additional features similar to those of the RFID device detection systems.

Figure 11:
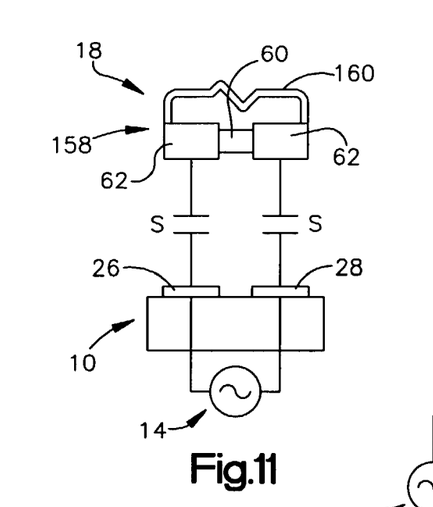
FIG. 11 is a schematic diagram of coupling between an RFID device and an RFID device detection system, according to the invention.

FIG. 11 illustrates another configuration of an antennaless RFID device 18, in which a device 158, such as a strap have some structures corresponding to the device 18' (FIG. 5) discussed above, also has an additional shunt inductor 160 coupling the conductive leads 62 on either side of a chip 60. As illustrated in FIG. 11, the reader 14 of the RFID device detection system 10 acts as an AC voltage source, sending a signal to the transmission lines 26 and 28. The coupling elements 26 and 28 capacitively couple with the corresponding conductive leads 62 of the device 158, with each coupling having a capacitance S.

Figure 12:
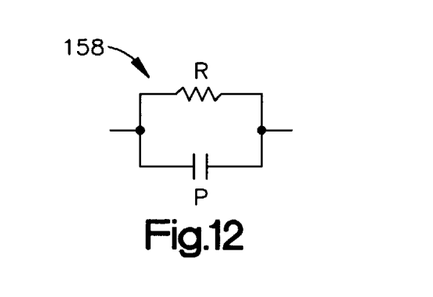
FIG. 12 is a circuit diagram of the equivalent circuit of the chip of the RFID device of FIG. 11.
Figure 13:
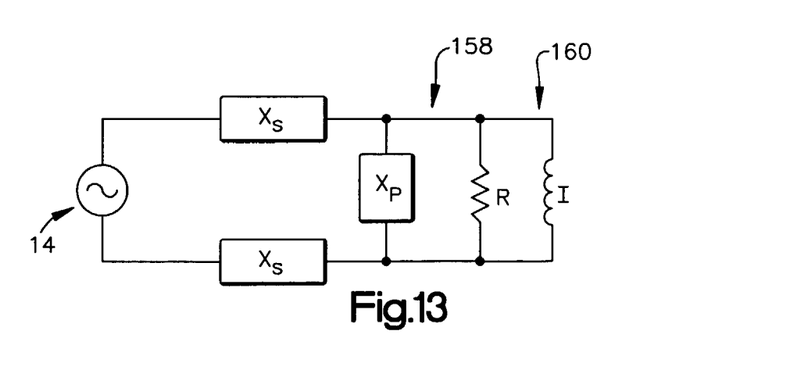
FIG. 13 is a circuit diagram of the RFID device and the RFID device detection system of FIG. 11.
Figure 14:
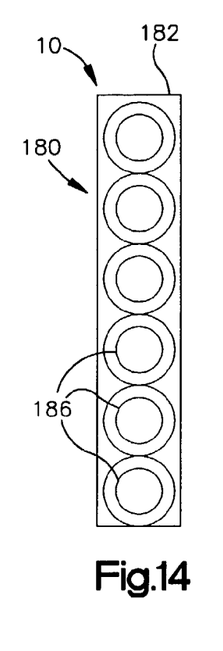
FIG. 14 is a plan view of an alternate embodiment RFID device detection system in accordance with the present invention, a device detection system incorporated into a counter or shelf.
Figure 15:
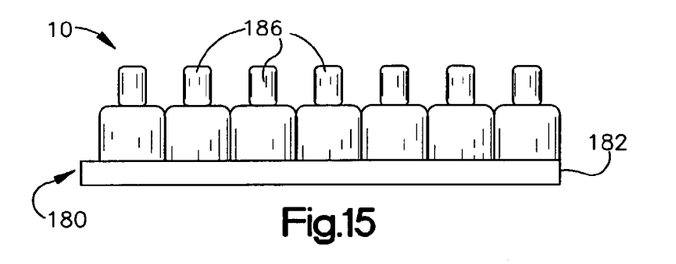
FIG. 15 is a side view of the RFID device detection system of FIG. 14.

Turning now to FIG. 12, the RFID chip 60 may be modeled as a resistor having resistance R, in parallel with a capacitor having capacitance P. Thus, the circuit of configuration of FIG. 11 may be illustrated as in FIG. 13, with the inductor 160 modeled as an inductance 1. The capacitive couplings have impedance of $X_s$, where $X_s=1/(2\pi fS)$, and the chip 60 has a capacitance of $X_p$, where $X_p=1/(2\pi fP)$. The voltage drop across R (the strength of the signal powering the chip 60) may advantageously increased be either reducing $X_s$ or increasing $X_p$. $X_s$ may be reduced by adding structures, such as ridges, to the coupling elements 26 and 28 and/or to the conductive leads 62. $X_p$ may be increased by selecting I such that the shunt inductor has equal and opposite reactance to the effective capacitance $X_p$ of the chip 60. This effectively tunes out the effect of the capacitance $X_p$ of the chip 62. Thus the presence of the shunt inductor 160 may improve performance of the device 158 in conjunction with the RFID device detection system 10.

The shunt inductor 160 may have any of a variety of suitable configurations. For example, the inductor 160 may be a loop or circuit of conductive material coupled at its ends to respective of the conductive leads 62. The inductor 160 may be coupled to the leads by any of a variety of suitable methods, for example including use of soldering, welding, and/or conductive ink traces.

The inductor 160, being in parallel with the chip 62, also may advantageously provide a DC path between various of the conductive leads 62, which may protect the chip 60 against electrostatic discharge.

FIGS. 14–17 illustrate another embodiment, an RFID device detection system 10 having a transmission line structure 180 built into a counter or shelf 182. The system 10 is suitable for detecting the presence of RFID devices 18 placed on the bottoms of round objects 186, regardless of rotational orientation of the objects 186.

The transmission line structure 180 includes a plurality of coupling areas 190, each including a central round coupling element 192, and an outer coupling element 194 surrounding the central coupling element 192, with an annular gap 196 between the central coupling element 190 and the outer coupling element 192. The central coupling element 192 and the outer coupling element 194 may be considered parts of respective transmission lines. Regardless of the rotational orientation of the object 186 within the coupling areas 190, the RFID device 18 on the bottom of the object 186 is substantially centered about the gap 196, with the conductive leads 62 on opposite sides of the RFID chip 60 being operatively coupled to the central coupling element 192 and the outer coupling element 194, respectively.

The outer coupling elements 194 of the various coupling areas 190 are electrically connected together by straight segments 200, the outer coupling elements 194 and the straight segments 200 being parts of a central transmission line 202. Similarly, the central coupling elements 192 of the various coupling areas 190 are electrically coupled together by rear conductive contacts 206, for example on the underside of the shelf or counter 182, which couple the central coupling elements 192 to a ground structure 208. The ground structure 208 substantially surrounds the outer coupling elements 194 and the central coupling elements 192. One or more terminating resistors 210 couple together the central transmission line 202 and the ground structure 208 of at one end of the transmission line structure 180. At an opposite end, the transmission line structure 180 is coupled to a reader 14 and/or other components described above.

The shelf or counter 182 shown in FIGS. 14–17 facilitating tracking a plurality of circular-shaped objects, for example perfume containers or other round bottles, or tubes of lipstick. The shelf or counter 182 may utilized in a manner similar to that of other RFID device detections systems such as those described above.

Figures 16, 17:
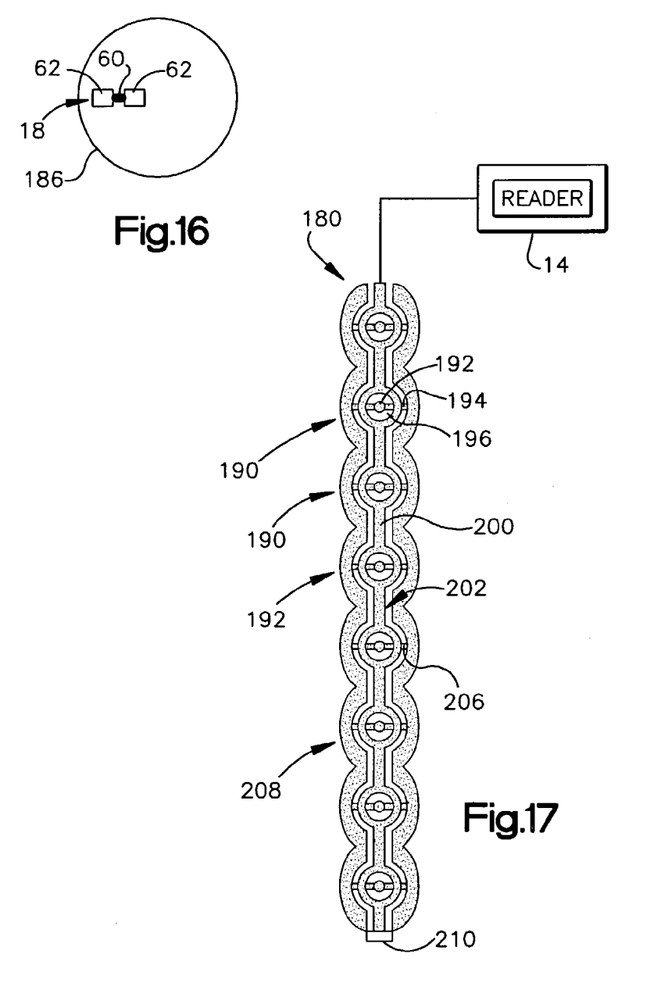
FIG. 16 is a bottom view an objection detectable by the device detection system of FIG. 14, showing the position of an RFID device on such an object.
FIG. 17 is a plan view illustrating the transmission line structure of the RFID device detection system of FIG. 14.

It will be appreciated that suitable variations may be made on the transmission line structure 180, for example varying the shapes or layout of the ground structure 208, the central coupling elements 192, and/or the outer coupling elements 190. It will further be appreciated that suitable variations may be had for handling objects with different shapes, such as objects with a rectangular or other shapes. For example, for square-shaped objects, the central coupling and the outer coupling element may be modified to be square shapes. Alternatively, arrangements with zig-zag-shaped or linear gaps may be utilized.

Figure 18:
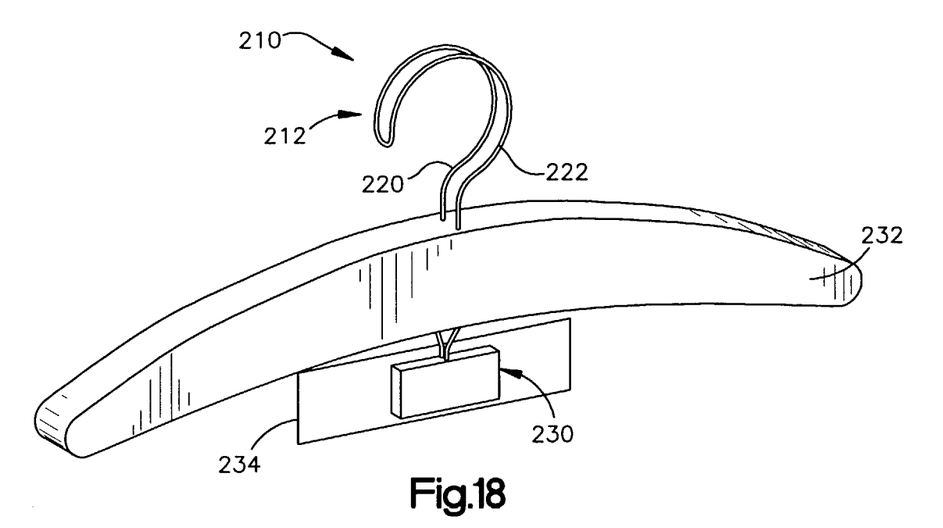
FIG. 18 is a view of a hanger that is part of yet another embodiment RFID device detection system in accordance with the present invention.
Figure 19:
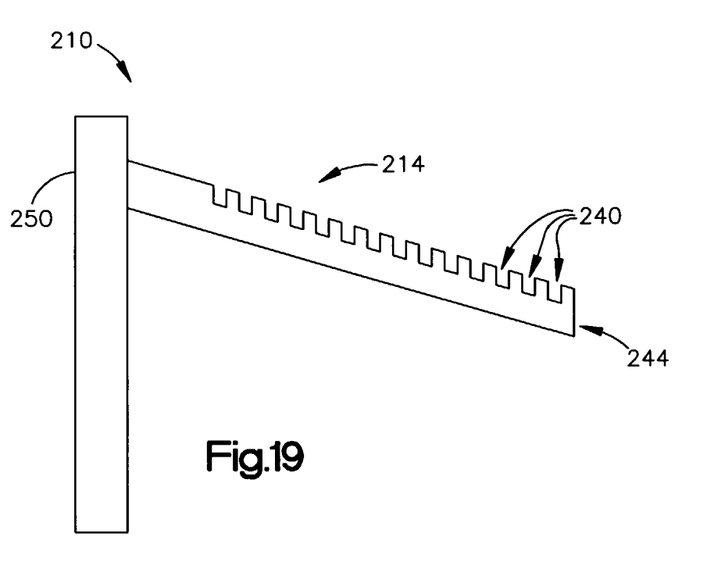
FIG. 19 is a side view of a rack for use in receiving the hanger of FIG. 18.

FIGS. 18 and 19 show another embodiment, a hanger-based RFID device detection system 210 for detecting RFID devices, for example devices embedded or attached to garments, such as by being incorporated into a garment label. The system includes one or more hangers 212 (FIG. 18), which are coupled to a rail 214 (FIG. 19) configured to receive and operatively couple to the hangers 212.

The hangers 212 include a pair of wires 220 and 222 that form a hook 224 at the top end of the hanger 212, for engaging the rail 214 or for hanging from a more traditional hanger support, such as a suitable rod or hook. The wires 220 and 222 are used to conduct electricity from the rail 214 when the hanger 212 is placed in a suitable opening in the rail 214. The wires 220 and 222 may be made of any of a variety of suitable electrical conductors. The wires 220 and 222 may be embedded in plastic or another suitable material, to provide mechanical strength and/or to prevent undesired contact between the wires 220 and 222, and other objects.

The wires 220 and 222 are connected to provide power and/or signals to a local coupler 230 configured to read RFID devices. The local coupler 230 may include components such as those described above with regard to other embodiments, such as transmission lines or other conductors for capacitive or other coupling to RFID tags or other devices. Alternatively or in addition, the coupler 230 may have other components, such as an antenna, for coupling with RFID devices.

A hanger bar 232 may be used to support a garment or other object placed on the hanger. The hanger bar 232 may be configured such that when a garment or other object is placed thereupon, a label 234 or other RFID-device-bearing part of the object is located in a desired position relative to the coupler 230.

Turning now to FIG. 19, the rail 214 includes a plurality of depressions 240. The rail 214 includes a transmission line structure 244 therewithin. The transmission line structure 244 is configured such that hangers 212 placed in the depressions 240 are electrically coupled to the transmission line structure 244 of the rail 214, so as to pass RF energy between the transmission line structure 244 of the rail 214 and the wires 220 and 222 of the hanger 212. The coupling between the transmission line structure 244 and the wires 220 and 222 may be capacitive or another suitable coupling mechanism.

The rail 214 is connected to a post 250, which supports the rail 214 and may contain other components of the system 210, such as a reader.

The RFID device detection system 210 may be used to detect antennaless RFID devices, such as the RFID straps described above. Alternatively or in addition, the RFID device detection system 210 may be used to detect antennaed RFID devices. For example, the system 210 may be used detect compact RFID devices, such as 2.45 GHz tags. In addition, the system 210 may be used to detect lower-frequency RFID devices. The system 210 advantageously brings RF energy in close proximity to the RFID device to be tested, reducing the need for large antennas, as well as overcoming energy propagation problems and potentially reducing power requirement.

It will be appreciated that the system 210 shown in FIGS. 18 and 19, and discussed above, is but one of a variety of possible RFID device detection systems that utilize a stationary part (e.g., the rail 214), for example containing a reader, and one or more separable parts (e.g., the hanger 212) that may be operably coupled with the stationary part, and may be separated from the stationary part. The separable part may include structure for mounting an object for display or sale, and/or may include structure for bringing a coupler or other RFID-device-detecting structure close to an RFID device in or on the object.

Figure 20:
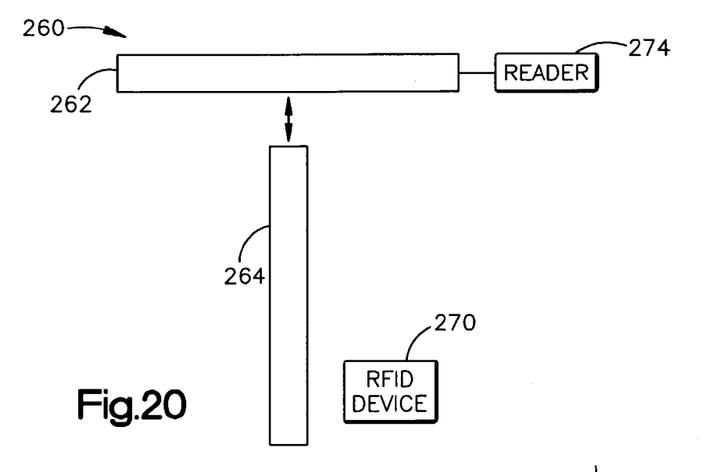
FIG. 20 is a schematic diagram of a broad concept of an RFID device detection system that utilizes separable parts as part of a transmission line structure.

From another point of view, the system 210 is one example of a broader category of systems that allow mounting or display of RFID-device-bearing objects, and include structure for extending a coupler or other RFID-device-detecting structure into or onto a object, to bring the coupler closer to the location of the RFID device coupled to the object. The broader concept is illustrated in FIG. 20, wherein a system 260 includes separable parts 262 and 264 as part of a transmission line structure 266 for proximity reading of an RFID device 270 by a reader 274. The separable parts 262 and 264 may each have a pair of conductors for transmitting electrical signals to and from the reader 274. The transmission of electrical signals between the separable parts 262 and 264 may be effected by contact between conductors of the parts 262 and 264.

It will be appreciated that the parts 262 and 264 may be a wide variety of types of parts that may be couplable and/or separable in a wide variety of ways. The coupling may be at only a few specified points along the parts 262 and 264, or alternatively may be along an entire length or other dimension of one or both of the parts 262 and 264. As described above, the parts 262 and 264 may be a hanger and a rail. Alternatively, the parts 262 and 264 may be matable parts, fitting one into another.

Figure 21:
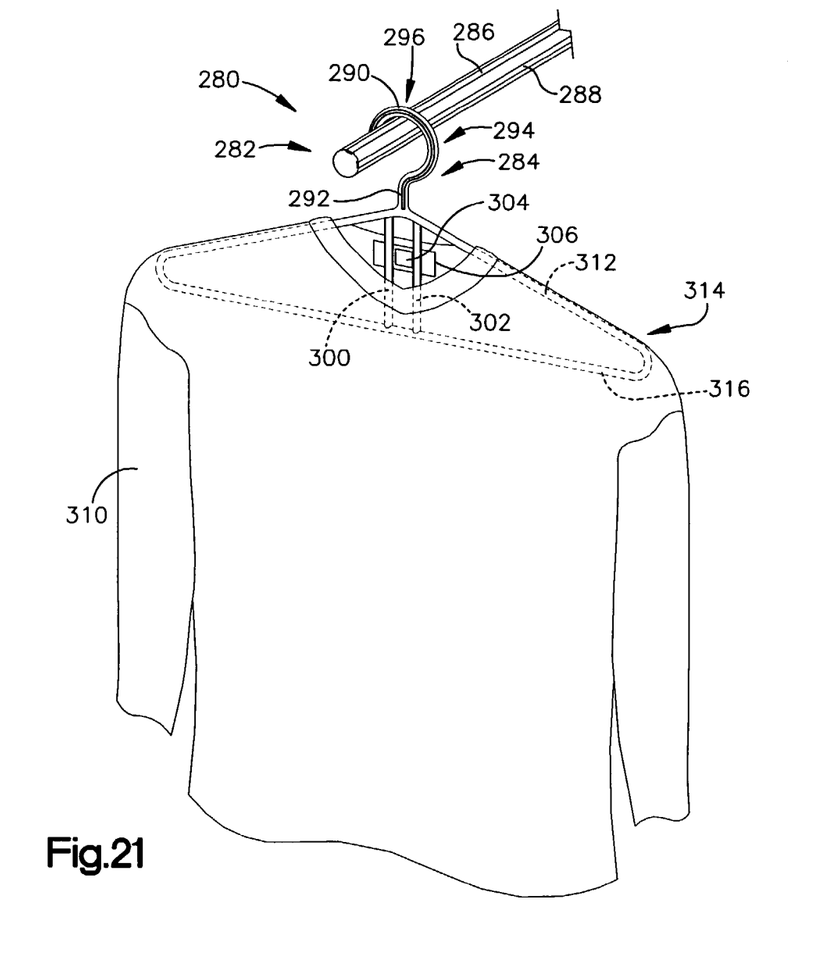
FIG. 21 is a view of another alternate embodiment RFID device detection system in accordance with the present invention, another hanger-based system.

Another example of a hanger-based system is the system 280 shown in FIG. 21. The system 280 includes a rod or rack 282 and a hanger 284. The rod 282 has a pair of rod conductors 286 and 288 running along a top side thereof. The hanger 284 has a pair of hanger conductors 290 and 292 that run along opposite sides of a hook 294 of the hanger 284, and onto the underside of the hook 294. There the hanger conductors 290 and 292 contact the rod conductors 286 and 288, respectively. The rod conductors 286 and 288 and the hanger conductors 290 and 292 thus collectively form all or part of a transmission line structure 296. Thus while the hanger 284 is on the rod 282, the conductors of the rod 282 and the hanger 284 are operatively coupled together. The hanger 284 is electrically coupled to the rod 282 at all locations where the rod conductors 286 and 288 run along the top side of the rod 282, which may be along all or substantially all of the length of the rod 282.

The hanger conductors 290 and 292 include respective coupling portions 300 and 302, which produce an electric field for interacting with an RFID device 304 that may be included in a tag or label 306 that is in, on, and/or a part of a garment 310. The coupling portions 300 and 302 may have substantial length, so as to allow some variability in the placement of the RFID device 304, due for example to variations in placement of the tag or label 306 (which may be due to variations by manufacturer or garment size), or variations in orientation of the garment 310 relative to the hanger 284. Thus the coupling portions 300 and 302 may extend from a top surface or bar 312 of a garment-receiving portion 314 of the hanger 284, to a bottom surface or bar 316 of the garment-receiving portion 314.

The hanger 284 may made of a suitable dielectric material, such as plastic, although it will be appreciated that at least parts of the hanger 284 may be made of other suitable materials, such as wood or metal, the latter being suitably insulated from the hanger conductors 290 and 292.

The RFID device 304 in the tag or label 306 may be read when the hanger 284 is operatively coupled to the rod 282. In addition, it may be possible to separately read the RFID device 304 by a long-range process when the hanger 284 is separated from the rod 282, with the hanger conductors 290 and 292 effectively providing an antenna for the RFID device 304.

The rod 282 has been shown as circular in cross section. However, it will be appreciated that the "rod" may in fact be in any of a variety of suitable shapes and configurations.

It will be appreciated that RFID device detection systems in the various embodiments described above may be or include wireless systems. Such systems may, for instance, send and receive modulated signals related to identity of RFID devices detected. These signals may be remotely monitored. It will be appreciated that suitable steps may be taken to avoid confusion from possible contention of signals from different racks or systems, for example spacing of signals pseudo randomly. In addition, separate racks of other system may be provided with an RFID device fixed therein or thereupon, to be detected by the RFID device detection system and to provide a unique identification associated with tags or other devices detected by that system.

Alternatively or in addition, a central system may monitor the power supply current provided to various amplifiers that power the various readers of separate systems included in a network. The power supply current represents the amplitude-modulated data being sent to RFID devices, and as well as the RFID device identities, consistent with a protocol for transmission of such identities.

Figure 22:
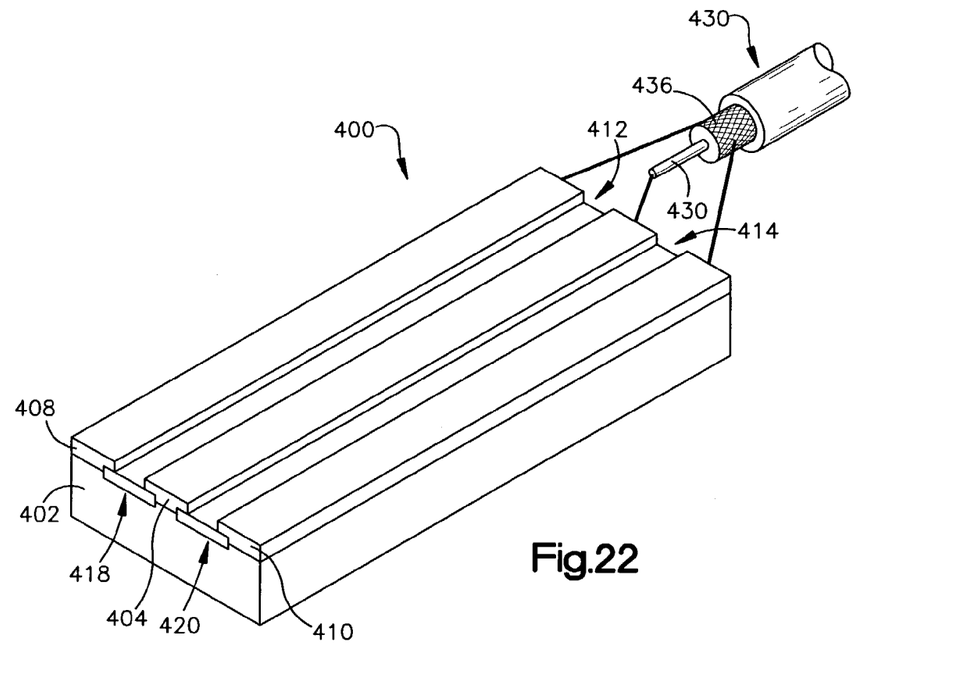
FIG. 22 is a view of a transmission line structure that may be utilized in an RFID device detection system in accordance with the present invention.

FIG. 22 shows an embodiment of a suitable transmission line structure 400. The transmission line structure 400 includes a supporting substrate 402, including a suitable dielectric material, such as a plastic material. A central driven element 404 and a pair ground elements 408 and 410 are on the substrate 402. The ground elements 408 and 410 are on either side of the driven element 404, with respective gaps 412 and 414 between the ground elements 408 and 410 and the driven element 404. Terminating resistors 418 and 420 are at a distal end of the transmission structure 400, coupling the driven element 402 to respective of the ground elements 408 and 410.

The transmission line structure 400 may be coupled to a coaxial cable 430, with for example a central conductor 432 of the cable 430 connected to the driven element 404, and with an outside conductor 436 of the cable 430 coupled to the ground elements 408 and 410. The coaxial cable 430 may couple the transmission line structure 400 to a reader or other components of an RFID device detection system.

RFID devices to be detected using the transmission line structure 400 may be located bridging the central driven element 404, extending over the gaps 412 and 414 on either side of the central driven element 404.

The terminating resistors 418 and 420 may have a resistance twice that of the line impedance, giving a parallel equivalence across each of the resistors 418 and 420 of the line impedance.

It will be appreciated that a balancing transformer is not required for the transmission line structure 400 shown in FIG. 22 and described above.

Figure 23:
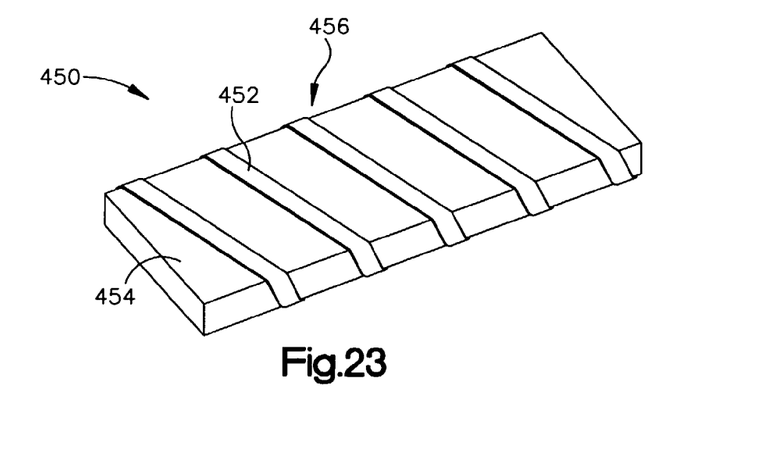
FIG. 23 is a view of yet another transmission line structure in accordance with the invention.

FIG. 23, illustrates another embodiment transmission line structure, a transmission line structure 450 that may be used for magnetically reading RFID devices. The transmission line structure 450 includes wire 452, for example copper wire, that is wound around a dielectric substrate 454, such as a plastic substrate. A coil 456 of wire is thus produced. When a suitable current is passed through the coil 456, for example through a 3 dB, 50 ohm attenuator, a magnetic field is produced, which may be used for detecting RFID devices, when the wire 452 is coupled to a suitable reader.

The transmission line structure 450 may be used to read relatively low frequency RFID devices, for example 13.56 MHz RFID devices.

It will be appreciated that the magnetic field in the coil 456 may be increased by suitably resonating the coil 456, thus increasing the current and hence the magnetic field.

It will be appreciated that other uses may be found for the proximity locators disclosed herein, for instance as built into a shelf of a display unit.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radio frequency identification (RFID) device detection system, comprising:
a reader; and
a proximity locator operatively coupled to the reader and mechanically coupled to the reader;
wherein the proximity locator includes a transmission line structure that includes at least two conductors; and
wherein the conductors are configured to produce a radio frequency (RF) field between the conductors for detecting an RFID device.

2. The RFID device detection system of claim 1, wherein the conductors are substantially parallel to one another, with a gap therebetween.

3. The RFID device detection system of claim 2, wherein the gap is an air gap.

4. The RFID device detection system of claim 2, wherein the gap has a width of from 0.1 to 50 mm.

5. The RFID device detection system of claim 1, wherein the conductors are parts of a protrusion configured, for hanging therefrom, objects with respective RFID devices coupled thereto.

6. The RFID device detection system of claim 5, wherein the conductors have an air gap therebetween able to receive at least part of the RFID devices therein.

7. The RFID device detection system of claim 1, wherein the conductors are mounted on a substrate of dielectric material.

8. The RFID device detection system of claim 1, wherein the conductors are at least parts of respective rods that are in turn parts of a protrusion configured, for hanging therefrom, objects with respective RFID devices coupled thereto.

9. The RFID device detection system of claim 1, wherein the proximity locator has additional transmission line structures that produce RF electric fields at additional locations.

10. The RFID device detection system of claim 9, wherein the transmission line structures are at least parts of respective protrusions.

11. The RFID device detection system of claim 1, wherein the proximity locator is part of a rack for displaying items.

12. The RFID device detection system of claim 1, in combination with the RFID device, which is operatively coupled to the transmission line structure.

13. The combination of claim 12, wherein the RFID device is an antennaless RFID device.

14. The combination of claim 13, wherein the antennaless RFID device includes an RFID chip and conductive leads connected to the chip.

15. The combination of claim 14, wherein the antennaless RFID device further Includes an inductor connecting one of the conductive leads to another of the conductive leads.

16. The combination of claim 12, wherein the RFID device is an antennaed RFID device.

17. The combination of claim 12, wherein the RFID device is at least partially in a gap between the transmission lines.

18. The RFID device detection system of claim 1, wherein the proximity locator includes a load coupled to the conductors.

19. The RFID device detection system of claim 18, wherein the load is a terminating resistor.

20. The RFID device detection system of claim 1, wherein the conductors include a driven conductor between a pair of ground conductors.

21. The RFID device detection system of claim 20, wherein the driven conductor and the ground conductors are substantially co-planar.

22. The RFID device detection system of claim 21, wherein the driven conductor and the ground conductors are conductive strips.

23. The RFID device detection system of claim 20, wherein at least one of the ground portions is electrically coupled to a central portion that is substantially surrounded by a substantially annular portion of the central portion.

24. The RFID device detection system of claim 20, further comprising a coaxial cable that includes a central conductor and an outside conductor;
wherein one of the conductors of the cable is electrically connected to the ground conductors; and
wherein the other of the conductors of the cable is electrically connected to the driven conductor.

25. The RFID device detection system of claim 1, wherein at least one of the conductors Includes a plurality of ridges thereupon.

26. The RFID device of detection system of claim 25, wherein adjacent pairs of the ridges define troughs therebetween; and wherein the troughs are configured to receive at least part of an RFID device.

27. The RFID device of detection system of claim 25, wherein the ridges each have a tapered shape that is broader at a proximal base than at a distal end.

28. The RFID device detect ion system of claim 25, wherein the ridges include a resilient material.

29. The RFID device detection system of claim 28, wherein the ridges include a conductive material coating the resilient material.

30. The RFID device detection system of claim 1,
wherein the system includes a first part that includes the reader;
wherein the system includes a second part that Includes the at least two conductors; and
wherein the first and second parts are mechanically separable from one another.

31. The RFID device detection system of claim 30, wherein at least part of the first part separably fits into at least part of the second part, thereby mechanically coupling the parts together.

32. The RFID device detection system of claim 30, wherein at least part of the second part fits into a depression of the first part.

33. The RFID device detection system of claim 30,
wherein the first part includes a rack; and
wherein the second part includes a hanger that is couplable to the rack.

34. The RFID device detection system of claim 33, wherein the hanger includes a hook couplable to the rack.

35. The RFID device detection system of claim 34, wherein the hook of the hanger fits into a depression in the rack.

36. The RFID device detection system of claim 35, wherein the depression is one of a plurality of depressions in the rack.

37. The RFID device detection system of claim 35, wherein the rack and the hook are electrically coupled when the hook is in the depression, so as to enable transmission of electrical signals between the reader and the conductors of the transmission line structure.

38. The RFID device detection system of claim 37, wherein the hook includes a pair of wires for electrically coupling with the rack.

39. The RFID device detection system of claim 38, wherein the wires include electrically-conductive material coated by a plastic material.

40. The RFID device detection system of claim 33, wherein the hanger includes a hanger bar for receiving a garment.

41. The RFID device detection system of claim 40, wherein the hanger bar and the conductors are relatively located such that a label of the garment is in close proximity to the conductors when the garment is on the hanger bar.

* * * * *